May 8, 1923.                                                1,454,635
E. E. GOLD
THERMOSTATIC ELECTRIC CONTROL FOR HEATING SYSTEMS
Filed April 6, 1922                    2 Sheets-Sheet 1
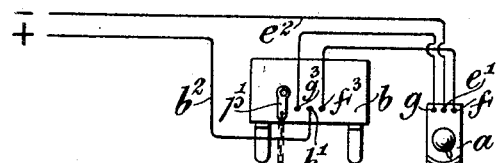
Fig. 1.
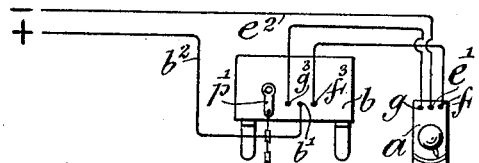
Fig. 2.
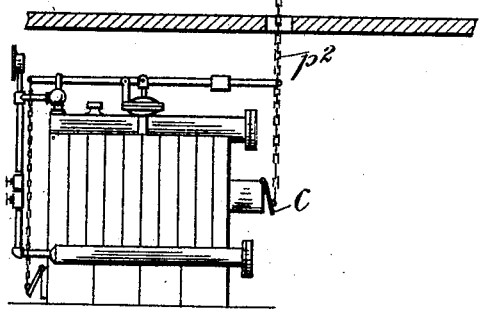
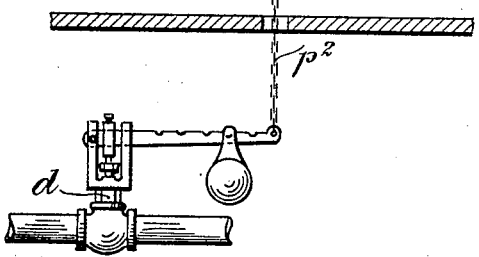
Fig. 4.
Fig. 3.
INVENTOR
Edward E. Gold
BY
Redding & Greeley
ATTORNEYS May 8, 1923.
E. E. GOLD
1,454,635
THERMOSTATIC ELECTRIC CONTROL FOR HEATING SYSTEMS
Filed April 6, 1922  2 Sheets-Sheet 2
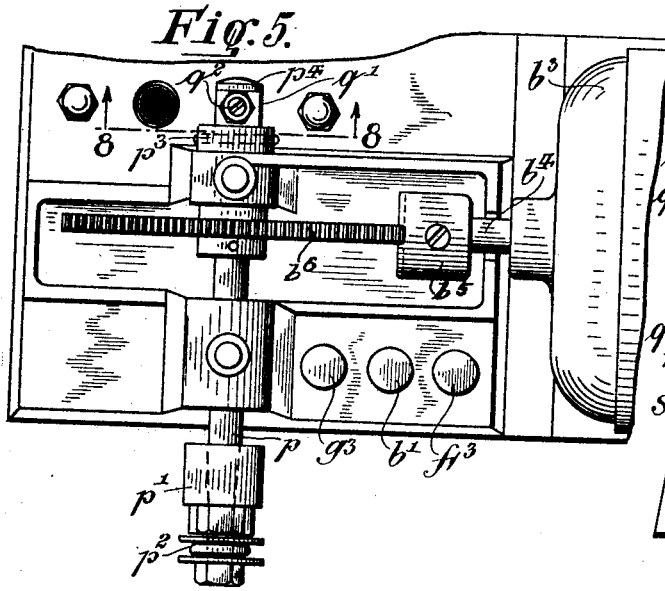
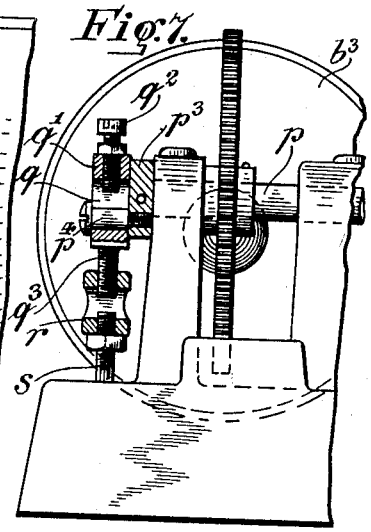
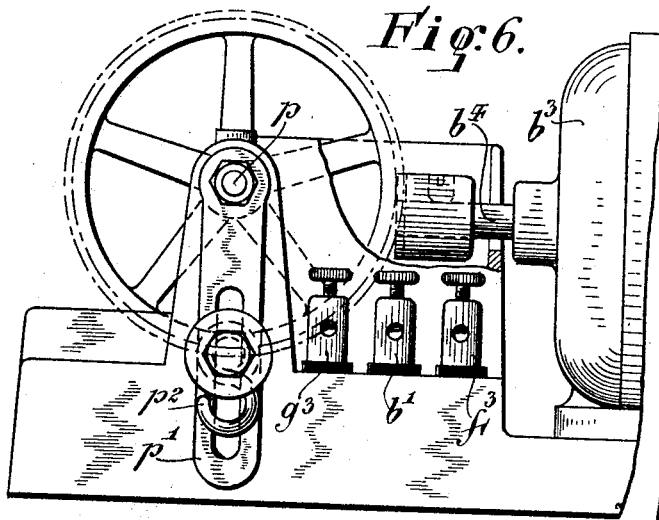
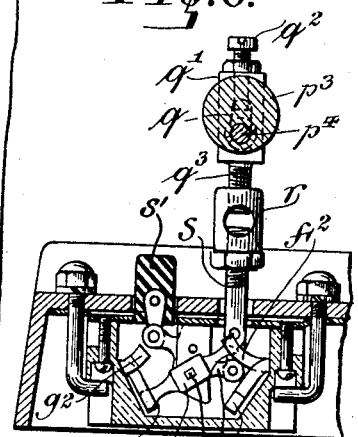
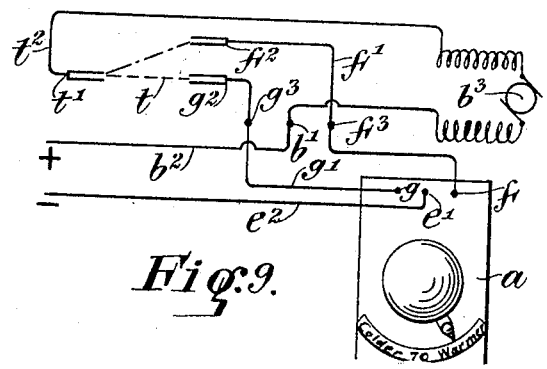
INVENTOR
Edward E. Gold
BY
Redding & Greeley
ATTORNEYS Patented May 8, 1923.

1,454,635

UNITED STATES PATENT OFFICE.

EDWARD E. GOLD, OF NEW YORK, N. Y., ASSIGNOR TO GOLD CAR HEATING & LIGHTING COMPANY, OF BROOKLYN, NEW YORK, A CORPORATION OF NEW YORK.

THERMOSTATIC ELECTRIC CONTROL FOR HEATING SYSTEMS.

Application filed April 6, 1922. Serial No. 549,968.

*To all whom it may concern:*

Be it known that I, EDWARD E. GOLD, a citizen of the United States, residing in the borough of Manhattan of the city of New York, in the State of New York, have invented certain new and useful Improvements in Thermostatic Electric Controls for Heating Systems, of which the following is a specification, reference being had to the accompanying drawings, forming a part hereof.

This invention relates to improvements in the elements included within a thermostatic electric control of the type shown, described and claimed in my Patent No. 1,424,896. More particularly, the present improvements seek to simplify and cheapen the cost of manufacture of certain of the elements and to render their operation more certain and accurate and facilitate their assembling and adjustment. Generally speaking, the system is improved by changing the construction of the thermostat element and the connections between it and the controlling switch for the electric circuit whereby the movement of the thermostat element is more sensitive and impelling and its adjustment simplified and made more accurate for initiation of operation of the controlling element at predetermined temperatures. Again, it has been found in practice that the controlling system covered in the copending application referred to did not lend itself to the most economical production or operation in view of the provision of a specially constructed commutator for controlling automatically the electric circuit. The present improvements eliminate such commutator and provide in place thereof a sensitive quick-break to a switch which may be of standard construction and be operatively connected with the armature of the actuating motor for automatic throwing at the extremes of the range of temperature for which the thermostat is set.

The improvements will appear more particularly hereinafter with reference to the embodiment hereof shown in the accompanying drawings wherein:

Figure 1 is a schematic view indicating the complete apparatus as employed for controlling the damper of a furnace.

Figure 2 is a view similar generally to Figure 1 but showing the control of a valve in a pipe through which passes the heating medium.

Figure 3 is a view in vertical section taken through the improved thermostatic element.

Figure 4 is a view in rear elevation of the improved thermostat.

Figure 5 is a view in plan of the operative connections between the motor and the electrical and mechanical elements actuated thereby.

Figure 6 is a view in side elevation of the parts shown in Figure 5.

Figure 7 is a view partly in end elevation and partly in vertical section showing the connection between the motor and an ordinary two button switch of standard design.

Figure 8 is a view in vertical section through a suitable form of switch and the actuating member therefor taken on the plane indicated by the line 8—8 of Figure 5 and looking in the direction of the arrows.

Figure 9 is a simple wiring diagram indicating how the switch functions to make and break the motor circuit.

As disclosed in the copending application it is proposed by means of the improved system to automatically control the temperature of a room or compartment by means of a thermostat which is mounted in the room or compartment within a casing $a$ and is adapted to close the circuit of a controlling motor which may be mounted within the casing $b$, at predetermined temperatures for the purpose of actuating a damper $c$ of a heating furnace or a valve $d$ in the pipe of a heating system to raise or lower the temperature of the room or compartment as may be desired. The thermostatic control is illustrated in Figures 3 and 4, the parts thereof, generally speaking, being mounted within or on the casing $a$. The switch member $e$ employed and the terminals $f$, $g$, with which it co-operates may be similar to the parts disclosed in said copending application. The switch member $e$ is engaged by a swinging arm $h$ which is maintained yieldingly in one position by means of a spring $h'$ while the arm is pulled in the opposite direction against the action of said spring by the expansion of a thermostatic vessel $i$. Movement of the arm $h$ into one or the other extreme positions causes movement of the switch $e$ from one terminal $f$ to the other $g$. Quick movement is insured by means of a spring $d'$ which is engaged with the switch and snaps it through dead center.

The improved thermostat includes a bushing $k$ which is rotatably journaled in the front wall of the casing $a$ and is movable manually by an exposed finger $k'$ secured to the bushing whereby the latter may be rocked to change its angular position without, however, moving it axially. The bushing $k$ is threaded internally to receive a threaded stud or seat $l$ on which seats the diaphragm $i$. These threads are preferably rather steep so that rotation of the bushing $k$ will cause pronounced axial movement of the seat $l$. The diaphragm $i$ is supported at the other end by means of a stud $i'$ which has its end rounded to seat in an antifriction cup bearing $m$ which is secured through a threaded shank in a swinging lever $n$ hinged at $n'$ to a strap $o$ secured to the front wall of the casing $a$. The strap $o$ is formed with an irregular aperture $o'$ through which extends the seat $l$, this seat being formed irregularly to conform to the irregular aperture $o'$ so that it may not rotate when the bushing $k$ is rotated but may only move axially. The free end of the swinging lever $n$ is engaged through a link $n^2$ with the swinging lever $h$ so that movements of the diaphragm $i$ are communicated to the lever for the purpose of moving the switch member $e$ accordingly. A spring stop $n^3$ may be mounted on the lever $n$ and co-operate with the end of the link $n^2$ to limit its movement with respect to the lever.

The switch member $e$ is constantly connected through a terminal post $e'$ with one of the main lines $e^2$ of the electrical circuit to be controlled. One of the leads $b'$ of the motor is connected to the other main line $b^2$ of the circuit to be controlled. The problem is to initiate operation of the controlling motor by the action of the thermostat $i$ when the room temperature falls to a minimum or rises to a maximum so that the motor will move the element $c$, $d$, to be controlled in such manner as to increase or decrease the room temperature as may be required. It is also necessary to shut off the motor after it has opened or closed the heat controlling valve. The motor indicated at $b^3$ has its armature $b^4$ geared operatively to a shaft $p$ by means of a gear wheel $b^5$ on shaft $b^4$, which has spiral teeth in the end face thereof meshing with the gear wheel $b^6$ on shaft $p$. On shaft $p$ is mounted an arm $p'$ connected operatively as through a chain $p^2$ with the element $c$, or $d$, to be controlled. The armature is also connected to operate a switch in circuit with the motor for shutting off the motor after it has opened or closed the heat controlling valve. That is to say, the motor shuts itself off at the proper time. In the simplest form such an operative connection is obtained through the driven shaft $p$ this shaft carrying at one end a disk $p^3$ on which is mounted excentrically a stud bolt $p^4$. This bolt rides in a slot $q$ in a link member $q'$, the range of movement of the bolt in the slot being limited conveniently by an adjustable stop screw $q^2$. The lower part of the link member $q'$ is threaded as at $q^2$ for engagement with the turn buckle $r$ with which is engaged a lower link member $s$ the parts when united constituting a connecting rod between the shaft $p$ and the elements of the switch now to be described.

The switch shown in Fig. 8 is an ordinary push button switch of the two button type. One button is shown at $s'$; in place of the other button is the link $s$; however, the button $s'$ is not to be used here. The link $s$ is pivoted to an arm $s^2$, which rotates the shaft $s^3$ on which the switch arm $t$ is mounted, to swing the switch arm. This arm $t$ is always connected to one of the motor terminals by the lead $t^2$, as shown in Fig. 9. The swinging switch arm $t$ is adapted to contact with the terminals $t'$, $t'$, whether in one position or the other, and is adapted to contact alternately with the terminals, $g^2$ and $f^2$, which are in turn respectively connected to the contact points $g$ and $f$, as shown in Fig. 9. The left hand contact $t'$, Fig. 8, is not connected to $g^2$, nor is the right contact $t'$, connected to $f^2$. The binding posts $g^3$, $b'$, and $f^3$, Fig. 6 are for connecting the several leads as shown in Fig. 9.

The operation will now be readily understood. The hand lever $k'$ of the thermostat is moved on its scale until it indicates the condition desired in the room. This adjustment rocks the bushing $k$ so as to move the seat $l$ of the thermostat $i$ closer to or away from the swinging lever $n$. The thermostatic vessel $i$ will then have to expand a greater or less distance to move the arm $n$. Normally, the switch member $e$ will engage the terminal $f$. At this time, the motor will be at rest with its armature in such angular position that the switch $t$ will be found connecting the terminal $g^2$ with the lead $t^2$ thereby leaving the motor circuit open. At this time, the controlled element $c$, $d$, will be in such condition as to bring about an increase in the temperature of the room. When the temperature has increased to the predetermined extent the vessel $i$ will have expanded to a point where it will swing the lever $n$ and thereby cause the lever $h$ to be rocked and move the switch member $e$ into engagement with the other terminal $g$. Thereupon, the motor circuit will be completed and movement of the motor initiated. Its movement will, of course, swing the arm $p'$ until the position of the controlled element $c$, $d$, is such as to ultimately bring about a reduction in the temperature of the room. Simultaneously, the rotation of the shaft $p$ will, through the connecting rod $q'$, $s$, throw the switch $t$ so that it will connect the terminal $f^2$ with the lead $t^2$ thus breaking the motor circuit and causing the motor to come to rest with all of the parts in the positions described. When the room temperature has dropped to the predetermined point and the thermostatic vessel $i$ contracted correspondingly, the spring $h'$ will snap the switch $e$ from the terminal $g$ to the terminal $f$, again closing the motor circuit whereupon the motor is operated to bring the valve $c$, $d$, back to the original position and the motor shuts itself off automatically.

The features and improvements in the thermostatic control as illustrated particularly in Figures 3 and 4 and the employment of a double throw switch of standard construction adapted to be operated from the motor armature constitute improvements in this apparatus; not only by reducing the cost of manufacture and simplifying the construction but also by contributing to greater facility in assembling and greater delicacy and certainty in operation. However, mechanical changes in the design of the parts and a different form of switch than the one described, may be resorted to without departure from the spirit of the invention.

What I claim is:

1. Apparatus for the thermostatic electric control of heating systems including, in combination, an expansible vessel adapted to be moved bodily, an electric motor, devices the movement of which is initiated by the expansible vessel to control the circuit of the motor, a controlled element in the heating system operatively connected to the motor, an adjustable seat for the thermostat formed with threads, a rotatable element having cooperating threads for engagement with the threads on said seat, means to hold the seat against rotation while permitting axial movement thereof and a manually operated indicator arm operatively connected to the second named element to effect rotation thereof.

2. An electric motor for controlling heating systems connected to one conductor of an electrical circuit, two switch terminals, a switch member in operative engagement alternately with the said switch terminals, said switch member completing the motor circuit in both of its alternate positions, operating means for said switch connected with the armature of the motor to throw it when the armature is in predetermined positions and a second switch connected in the motor circuit and movable alternately under the influence of the thermostat into engagement with one or the other of the leads from said first named switch terminals to control the motor circuit.

3. An electric motor for controlling heating systems connected to one conductor of an electrical circuit, two switch terminals, a switch member in operative engagement alternately with the said switch terminals, said switch member completing the motor circuit in both of its alternate positions, operating means for said switch connected with the armature of the motor, an adjustable link engaged with such switch member to throw it into its alternate postions and an eccentric mechanism driven by the armature of the motor and engaging said link connection for reciprocating it, and a second switch connected in the motor circuit and movable alternately under the influence of the thermostat into engagement with one or the other of the leads from said first named switch terminals to control the motor circuit.

4. An electric motor for controlling heating systems connected to one conductor of an electrical circuit, two switch terminals, a switch member in operative engagement alternately with the said switch terminals, said switch member completing the motor circuit in both of its alternate positions, operating means for said switch connected with the armature of the motor, a shaft driven by the armature of the motor, an arm on the shaft, a connection between the arm and the controlled element of the heating system, an eccentric on the said shaft, an adjustable link connection between said eccentric and said switch member for throwing the latter into its alternate positions and a second switch connected in the motor circuit and movable alternately under the influence of the thermostat into engagement with one or the other of the leads from said first named switch terminals to control the motor circuit.

This specification signed this 3 day of April 1922.

EDWARD E. GOLD.